Figure 1:
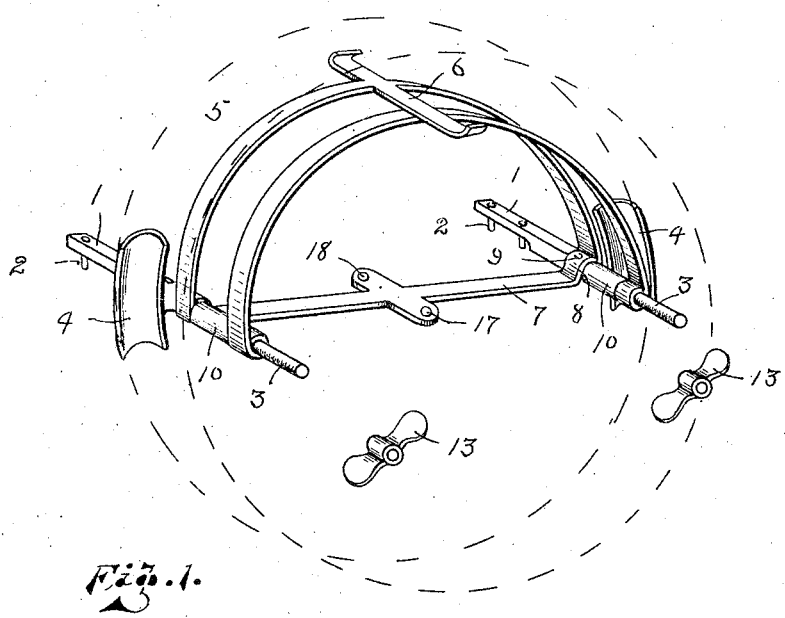

Jan. 1, 1929.

T. G. BOUNJIEM

TIRE CARRIER

Filed Sept. 2, 1927

1,696,997

Inventor
Thos. Geo. Bounjiem.
By Geo. Stevens.
Attorney

Patented Jan. 1, 1929.

1,696,997

UNITED STATES PATENT OFFICE.

THOMAS G. BOUNJIEM, OF DULUTH, MINNESOTA.

TIRE CARRIER.

Application filed September 2, 1927. Serial No. 217,100.

This invention relates to tire carriers for automobiles, the principal object being to provide a more convenient and practical device for carrying one or more spare tires.

Other objects and advantages of the invention will appear in the further description thereof.

Figure 2:
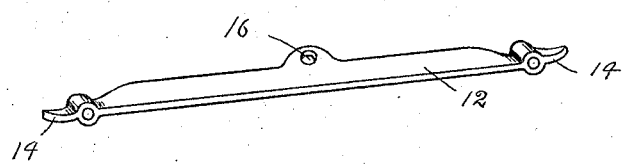

Referring now to the accompanying drawing, forming part of this application, and wherein like reference characters indicate like parts:

Figure 1 is a perspective view of one of the carriers equipped for the support of two tires suggested in dotted lines; and Figure 2 is a perspective view of the transverse holding bar.

1—1 represents two brackets of identical construction spaced the proper distance apart for the reception of a tire and attached to the automobile in any desired manner as by the bolts 2. These brackets extend outwardly from the automobile body and terminate in screw threaded portions 3. Preferably about midway the ends of each bracket is formed a laterally projecting concavo-convex segment 4 against which one side of the spare tire when mounted upon the carrier is placed. Just forwardly of these segments is an upwardly arched strap 5, the ends of which surround the circular portion of the brackets just inboard of the screw threaded portion for holding the arch in upright position, and centrally thereof is formed a horizontally disposed clip 6, being shorter upon its innermost end than its outermost, as it is designed to receive two tires when desired, and the strap 5 is normally centrally of the innermost tire when mounted thereupon.

As a permanent spacer for the brackets and locking means the transverse bar 7 is provided, it having gooseneck ends 8 which surmount the ends of the arch 5 and may be fixed as by a pin or set screw indicated at 9 to same and into the extension of the brackets.

Next upon each extension or bolt 3 of each bracket is mounted a spacing sleeve indicated at 10 which may be loosely applied thereto and then the second arch strap 11 is attached, it being similar in all respects to the arch 5 except that it has no central horizontal extension and is designed to bear up against such extension of the arch 5 to assist in supporting same when a second tire is carried.

The mechanism as described thus far is ready for the reception of two tires and after they are applied the holding bar 12 is slipped onto the bolts 3 when the thumb nuts 13 may be screwed into place, forcing the bar 12 up tightly with its protruding ends 14 engaging against the rim of the outer spare tire. The bar 12 is provided with a central extension having a hole 16 therethrough which when in place against the outermost one of two tires on the carrier will register with a like hole 17 in the bar 7 for the reception of any suitable padlock or other locking means; while if but a single tire is being carried the strap 11 together with the spacers 10 are removed, and when the bar 12 is applied to the carrier the hole 16 will register with the innermost hole 18 on the bar 7 and provide similar suitable locking means.

Having thus described my invention, what I claim and desire to secure by Letters Patent, is:

1. A tire carrier of the character described comprising two spaced horizontally disposed brackets, separable upwardly arched means for supporting one or more tires upon the carrier, said means being supported at either end thereof by the brackets and removable means for holding a tire in position thereupon.

2. A tire carrier of the character described comprising two spaced horizontally disposed brackets, upwardly arched means for supporting one or more tires upon the carrier one of said means assisting in the support of the other and being supported at either end thereof by the bracket, and means for holding a tire in position upon the carrier.

3. A tire carrier of the type described comprising two spaced brackets, tire clamping means projecting from each bracket, an upwardly arched support for the tire outboard of the clamping means and supported at either end thereof upon the brackets, a removable bar carried upon the brackets for cooperative clamping engagement with the tire, and means for locking the bar upon the carrier.

In testimony whereof I affix my signature.

THOMAS G. BOUNJIEM.